Figures 1, 2:
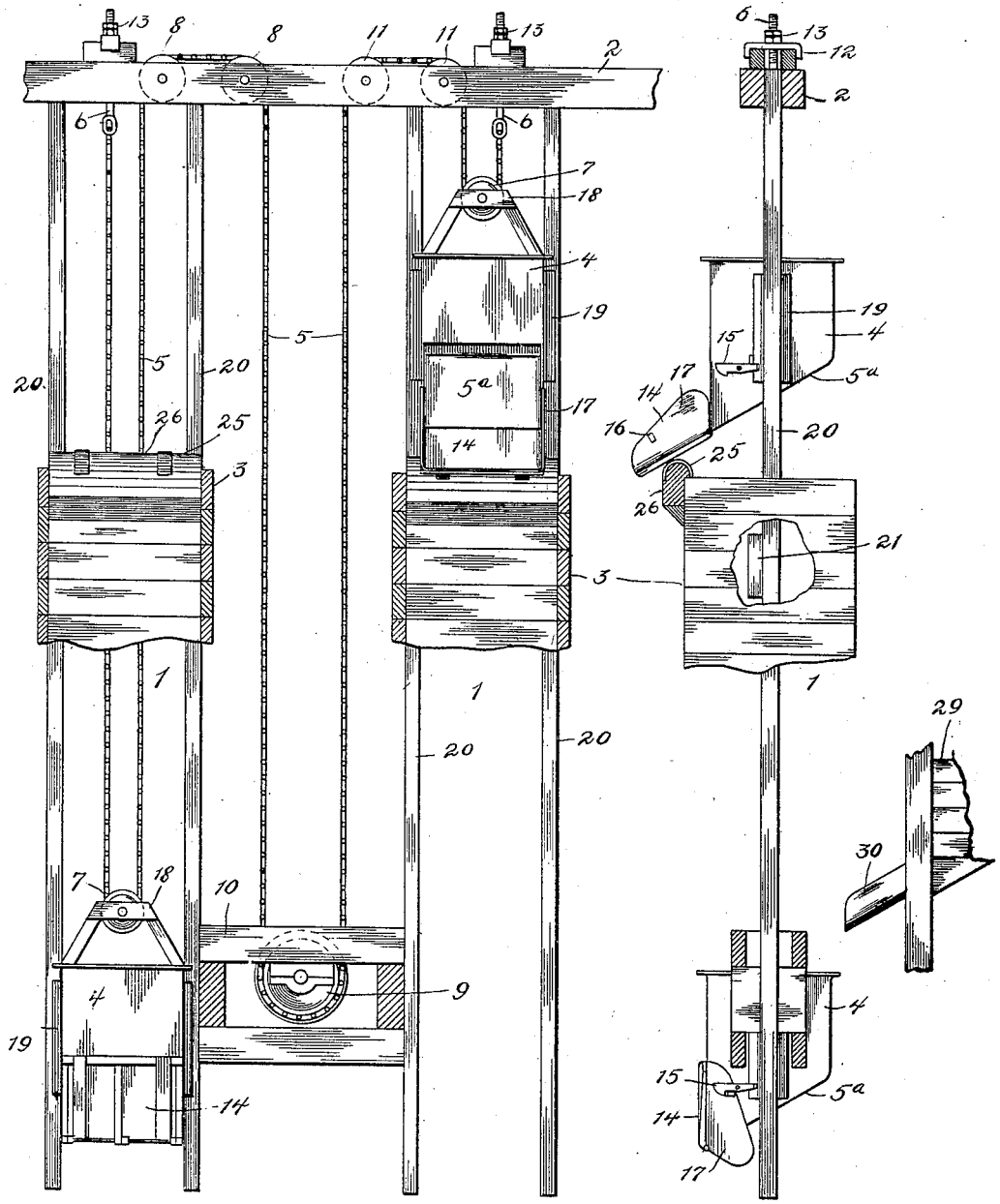

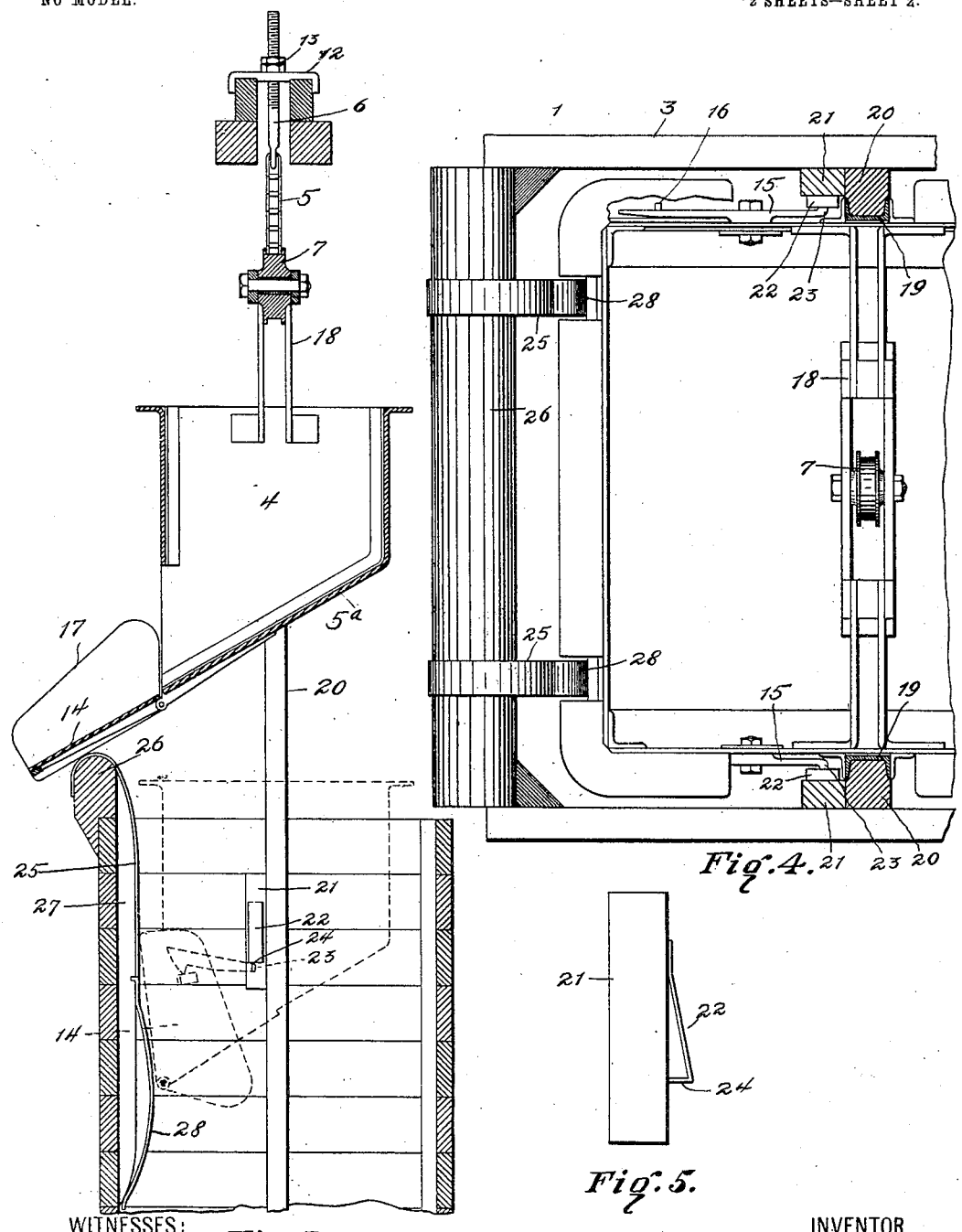

No. 763,182. Patented June 21, 1904.

UNITED STATES PATENT OFFICE.

AXEL R. HOLMEN, OF COLUMBUS, OHIO.

LOADING AND UNLOADING APPARATUS.

SPECIFICATION forming part of Letters Patent No. 763,182, dated June 21, 1904.

Application filed March 12, 1904. Serial No. 197,780. (No model.)

*To all whom it may concern:*

Be it known that I, AXEL R. HOLMEN, a citizen of Sweden, residing at Columbus, in the county of Franklin and State of Ohio, have invented a certain new and useful Improvement in Loading and Unloading Apparatus, of which the following is a specification.

My invention relates to an improvement in loading and unloading apparatuses, and more particularly to that class known as "vertical hoist and dump."

The object of the invention is to provide one or more pairs of buckets arranged to be automatically dumped and so suspended and elevated that the weight of one bucket counterbalances that of the other and that only sufficient power to overcome the inertia of the load is required to raise the loaded bucket.

Finally, the object of the invention is to provide a device of the type set forth that will be strong, durable, and efficient and one in which the working parts will not be liable to get out of operative order.

With the above and other objects in view the invention consists of the novel details of construction and operation, a preferable embodiment of which is described in the specification and illustrated in the drawings, wherein—

Figure 1 is a front elevation showing the application of the invention. Fig. 2 is an elevation broken away to show the tripping-block and setting forth a portion of the loading-hopper. Fig. 3 is a vertical sectional view of the upper portion of the shaft, showing one of the buckets in its unloading position and illustrating in dotted lines the position of the bucket during the tripping operation. Fig. 4 is a partial plan view of one of the shafts, showing the bucket broken away to disclose the latch; and Fig. 5 is a detail elevation of the tripping-block.

In the drawings the numeral 1 designates a pair of ordinary elevator-shafts, which are connected across their tops by bars 2 and formed with housings 3. Operating in the shafts are buckets 4, adapted to be raised and lowered by means of an endless chain 5, which has its ends fastened to eyebolts 6, supported between the beams 2. The chain is so arranged as to support the buckets one in a raised position and the other in a lowered position. The endless chain connected to one of the eyebolts 6 passes down the shaft and around a pulley 7, supported upon the bucket 4, up the shaft across a pair of idle sheaves 8, and down and around a driving-sprocket 9, suitably supported between the shafts upon the cross-bars 10, and thence up the shafts and across a pair of idle sheaves 11, then down again and around the pulley 7 of the other bucket, the end of the chain being attached to the other eyebolt 6. It will thus be seen that when one bucket is up the other is down, and that owing to the differential arrangement of the sheaves and pulleys the buckets 4 counterbalance one another, and that upon one rising the other is lowered, motion being transmitted to the endless chain by the driving sprocket or sheave 9. The eyebolts 6 are adjustably supported upon a cross-bar 12 by jam-nuts 13, whereby the tension of the chain may be varied by tightening or loosening the nuts 13, thus raising or lowering the said eyebolt. The bucket 4 is preferably formed of a suitable sheet metal, having an inclined bottom $5^a$ and a hinged door 14 at the lower end of the inclined bottom, closing an opening in the side of the bucket. The door is held in its closed position by a pivoted latch 15, engaging a lug 16, projecting from one of the wings 17 of the hinged door 14. The pulleys 7 are supported centrally over the buckets by the bails 18. Guide-strips 19 are secured to the sides of the buckets 4 and embrace the side rails 20 of the shafts 1, whereby the bucket is held in vertical alinement during its passage up and down the shaft. A tripping-block 21, carrying a tripping-piece 22, is secured to one of the rails 20 of each of the shafts and so arranged that the said tripping-piece 22 lies in the path of the latch 15 and the tripping-lug 23, carried thereby. The tripping-piece 22 is formed with a shoulder portion 24, against which the lug 23 contacts upon the elevation of the bucket 4, thus tripping the latch 15 and disengaging the same from the lug 16, as clearly shown in dotted lines in Fig. 3, thus allowing the door 14 to open and rest against the shoes 25, which facilitates the gradual opening of the door as the bucket is further elevated until the bucket reaches its uppermost position, when the door will occupy the position shown in full lines in Fig. 3—that is, substantially parallel with the bottom 5ᵃ of the bucket 4. On the descent of the bucket the latch 15, made of spring material, will slide along the inclined face of the tripping-piece 22, and thus clearly pass the same, the door being closed by the shoes 25, hooked over the rounded bar 26 and facing the elongated bearing-strips 27, which carry at their lower portions the bow-springs 28, which latter bear against the door, forcing the same to close and the lug 16 to ride under and be held by the hooked end of the latch 15. The springs 28 are secured at their upper ends to the strips 27, having their lower ends free, thus allowing them to give gradually to the pressure.

The bucket 4 in its loading position lies in a plane below the loading-hopper 29 and is loaded from the ordinary chute 30. (Shown in Fig. 2.) Motion being imparted to the driving-sprocket 9, the endless chain 5 is set in motion, and thus one bucket 4 is elevated while the other, having been emptied, is lowered. Upon reaching the position shown in dotted lines in Fig. 3 the lug 23 of the latch 15 engages under the shoulder 24 of the tripping-piece 22, thus disengaging the hooked end of the latch 15 from the lug 16 and allowing the door to rest against the shoes 25. As the bucket continues upwardly the door 14 continues to bear against the shoes 27, gradually opening until it rests on the rounded bar 26, as shown in Fig. 3, when it will lie in a plane substantially parallel to the inclined bottom 5ᵃ of the bucket, thereby delivering the load by force of gravity over the side of the housing 3. The motion of the drive-wheel 9 and chain 5 being reversed, the bucket is lowered, the door being gradually closed by its contact with the shoes 25 until it contacts with the bow springs 28, which gently complete the closure of the door, causing the hooked ends of the latches 15 to engage the lugs 16, and thus lock the door in its closed position.

It will be observed that the buckets occupy opposite positions with relation to each other—that is, one bucket ascending while the other descends. It is also readily apparent that the buckets counterbalance one another and that very little power is required to operate the same, as the force of gravity of the descending bucket tends to overcome the force of gravitation of the ascending bucket, and thus only a slight increase of the power required to overcome the inertia of the load is necessary. It is to be further noted that by so arranging the buckets a great saving of time is attained, as one bucket is being loaded while the other is unloading.

I do not desire to limit myself to the exact details of construction and operation herein set forth, as I may make various changes in the same without departing from the spirit of my invention and wholly within the scope of my claims.

Having now fully described my invention, what I claim, and desire to secure by Letters Patent, is—

1. The combination with a pair of shafts, and an elevating means, of buckets having discharge-openings supported by the elevating means, doors hinged to the buckets, means for locking the doors, means carried by the shafts for tripping the door-locking means, and shoes arranged to gradually open and close the doors.

2. The combination with a pair of shafts and elevating means, of buckets having inclined bottoms and discharge-openings, doors hinged over the openings having laterally-projecting lugs, latches carried by the buckets and normally engaging the lugs, tripping-blocks mounted on the shafts, angular tripping-cams carried by the blocks in the path of the latches to trip the same, and means for gradually opening and closing said doors.

3. The combination with a pair of shafts and elevating means, of buckets having discharge-openings supported by the elevating means, doors hinged to the buckets, means for locking the doors, means carried by the shafts for tripping the door-locking means and shoes having resilient faces for gradually opening and closing the doors.

AXEL R. HOLMEN.

In presence of—
M. B. SCHLEY,
W. L. MORROW.